(12) United States Patent
Venkataraman

(10) Patent No.: US 7,704,617 B2
(45) Date of Patent: Apr. 27, 2010

(54) HYBRID REFORMER FOR FUEL FLEXIBILITY

(75) Inventor: Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 495 days.

(21) Appl. No.: 11/730,529

(22) Filed: Apr. 2, 2007

(65) Prior Publication Data

US 2007/0231631 A1 Oct. 4, 2007

Related U.S. Application Data

(60) Provisional application No. 60/788,044, filed on Apr. 3, 2006.

(51) Int. Cl.
*H01M 8/06* (2006.01)
*B01J 8/04* (2006.01)

(52) U.S. Cl. .................... 429/17; 429/20; 422/190

(58) Field of Classification Search ............ 429/17, 429/19, 20, 30; 422/190, 191
See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van Dine | |
| 4,182,795 A | 1/1980 | Baker et al. | |
| 4,532,192 A | 7/1985 | Baker et al. | |
| 4,670,359 A | 6/1987 | Beshty et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,079,105 A | 1/1992 | Bossel | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,366,819 A | 11/1994 | Hartvigsen et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,527,631 A | 6/1996 | Singh et al. | |

(Continued)

FOREIGN PATENT DOCUMENTS

DE 40 05 468 A1 8/1991

(Continued)

OTHER PUBLICATIONS

U.S. Appl. No. 11/905,051, filed Sep. 27, 2007, Venkataraman.

(Continued)

*Primary Examiner*—Stephen J. Kalafut
(74) *Attorney, Agent, or Firm*—Foley & Lardner LLP

(57) ABSTRACT

A reformer for a fuel cell system includes a leading segment and a trailing segment. The leading segment includes less reactive catalyst and/or more stabilizing catalyst than the trailing segment. The reformer may be used for reformation of high and low hydrocarbon fuels.

25 Claims, 2 Drawing Sheets

U.S. PATENT DOCUMENTS

| | | | |
|---|---|---|---|
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,763,114 | A | 6/1998 | Khandkar et al. |
| 5,955,039 | A | 9/1999 | Dowdy |
| 6,013,385 | A | 1/2000 | DuBose |
| 6,051,125 | A | 4/2000 | Pham et al. |
| 6,280,865 | B1 | 8/2001 | Eisman et al. |
| 6,329,090 | B1 | 12/2001 | McElroy et al. |
| 6,348,278 | B1 | 2/2002 | LaPierre et al. |
| 6,403,245 | B1 | 6/2002 | Hunt |
| 6,423,437 | B1 | 7/2002 | Kenyon et al. |
| 6,436,562 | B1 | 8/2002 | DuBose |
| 6,451,466 | B1 | 9/2002 | Grasso et al. |
| 6,479,177 | B1 | 11/2002 | Roberts et al. |
| 6,492,050 | B1 * | 12/2002 | Sammes .................. 429/17 X |
| 6,531,243 | B2 | 3/2003 | Thom |
| 6,623,880 | B1 | 9/2003 | Geisbrecht et al. |
| 6,749,958 | B2 | 6/2004 | Pastula et al. |
| 6,821,663 | B2 | 11/2004 | McElroy et al. |
| 6,828,048 | B2 | 12/2004 | Margiott et al. |
| 7,452,619 | B2 * | 11/2008 | Ahmed ........................ 429/17 |
| 2001/0009653 | A1 | 7/2001 | Clawson et al. |
| 2001/0049035 | A1 | 12/2001 | Haltiner, Jr. et al. |
| 2002/0028362 | A1 | 3/2002 | Prediger et al. |
| 2002/0058175 | A1 | 5/2002 | Ruhl |
| 2002/0106544 | A1 | 8/2002 | Noetzel et al. |
| 2002/0142198 | A1 * | 10/2002 | Towler et al. .................. 429/17 |
| 2003/0129462 | A1 | 7/2003 | Yang et al. |
| 2003/0157386 | A1 | 8/2003 | Gottmann |
| 2003/0162067 | A1 | 8/2003 | McElroy |
| 2003/0196893 | A1 | 10/2003 | McElroy |
| 2003/0205641 | A1 | 11/2003 | McElroy |
| 2004/0191597 | A1 | 9/2004 | McElroy |
| 2004/0202914 | A1 | 10/2004 | Sridhar et al. |
| 2004/0224193 | A1 | 11/2004 | Mitlitsky et al. |
| 2004/0224197 | A1 | 11/2004 | Kralick |
| 2004/0258587 | A1 * | 12/2004 | Bowe et al. ............. 422/190 X |
| 2005/0048334 | A1 | 3/2005 | Sridhar et al. |
| 2005/0164051 | A1 | 7/2005 | Venkataraman et al. |
| 2007/0231628 | A1 | 10/2007 | Lyle et al. |
| 2007/0231635 | A1 | 10/2007 | Venkataraman et al. |

FOREIGN PATENT DOCUMENTS

| | | |
|---|---|---|
| DE | 199 24 777 A1 | 11/2000 |
| EP | 1 057 998 B1 | 11/2003 |
| EP | 1 571 726 A1 | 9/2005 |
| EP | 1 258 453 B1 | 1/2007 |
| JP | 06-104002 * | 4/1994 |
| WO | WO 00/61707 | 10/2000 |
| WO | WO 2004/093214 | 10/2004 |

OTHER PUBLICATIONS

U.S. Appl. No. 11/896,487, filed Aug. 31, 2007, Venkataraman.

Supplementary European Search Report mailed Nov. 4, 2009, received in European Application No. 07754708.1.

* cited by examiner

HYBRID REFORMER FOR FUEL FLEXIBILITY

This application claims benefit of priority of U.S. provisional application No. 60/788,044 filed on Apr. 3, 2006, which is incorporated herein by reference in its entirety.

BACKGROUND OF THE INVENTION

The present invention is generally directed to fuel cells and more specifically to balance of plant components, such as reformers, of high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

One embodiment of the invention provides a reformer for a fuel cell system comprising a leading segment and a trailing segment. The leading segment comprises less reactive catalyst and/or more stabilizing catalyst than the trailing segment.

DETAILED DESCRIPTION OF THE EMBODIMENTS

One embodiment of the invention provides a hybrid reformer for providing fuel flexibility for a fuel cell system, such as a solid oxide fuel cell (SOFC) system. In other words, a single reformer is adapted to reform two or more different fuels that are used with the system. Thus, the single reformer allows operation of the system on multiple fuels without requiring separate reformers for different fuels.

A fuel reformer is a device that reforms a hydrocarbon fuel into a fuel stream comprising hydrogen and carbon monoxide. For example, in a steam-methane reformation (SMR) reaction, steam and methane are reformed in a reformer to a stream comprising hydrogen, carbon monoxide and other components. A reformer may comprise a catalyst coated fuel passage, such as a cylinder having the catalyst coated on its interior walls and/or on an insert in the reformer housing. The insert may comprise a catalyst coated tube, foil or wire. Other reformer geometry, such as a rectangular passage or other polygonal passages, may also be used.

The reformer catalyst may comprise a catalyst mixture containing rhodium and nickel. rhodium is used for stability and nickel is used for reactivity. Noble metals other than rhodium or in combination with rhodium may also be used to enhance stability.

The catalyst composition is optimized for handling different fuels. For handling high hydrocarbon fuel, such as diesel and jet fuel (including JP5 and JP8), less nickel is used to avoid coking. For handling lower hydrocarbon fuels such as natural gas, methane, propane, methanol, ethanol, etc. more nickel is used.

Figure 1:
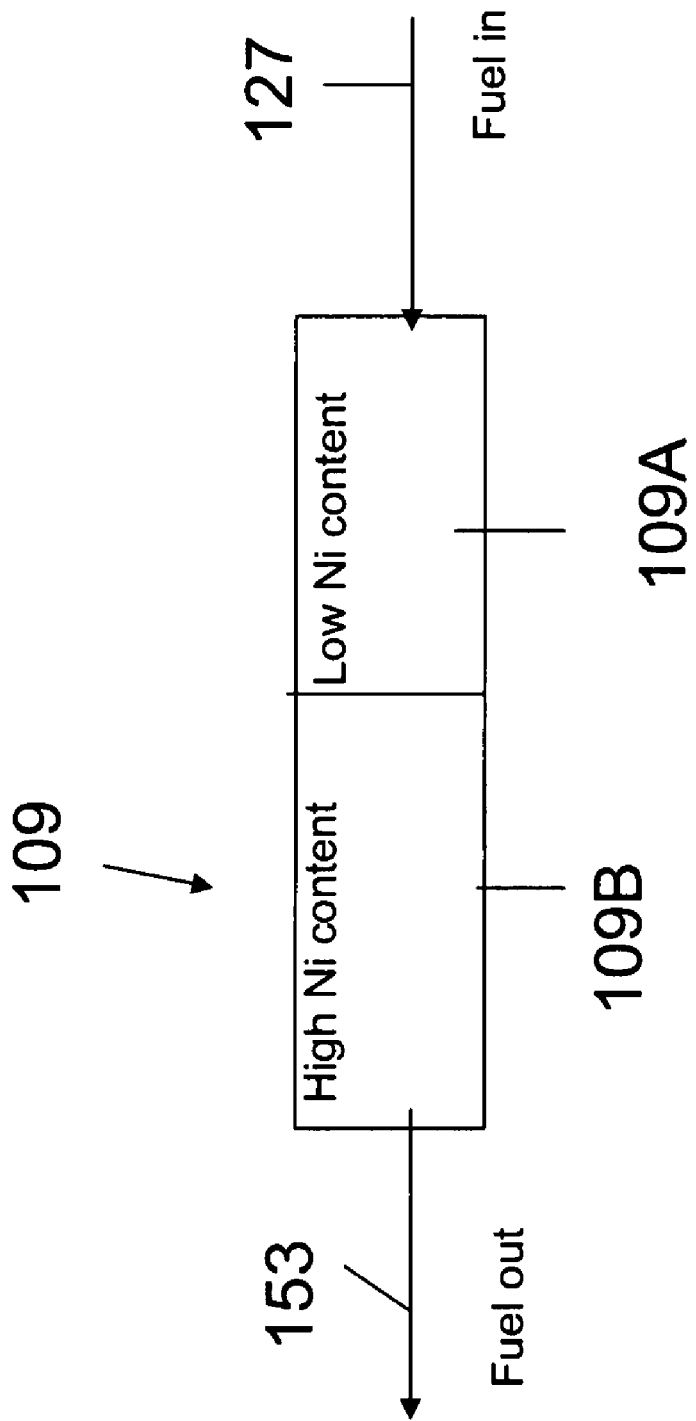
FIGS. 1 and 2 are schematics of a fuel cell system components according to embodiments of the present invention.

FIG. 1 shows a preferred configuration of the hybrid reformer 109 with two segments. The leading segment 109A (i.e., the segment where the fuel enters the reformer) from the fuel inlet conduit 127 contains less nickel for reforming a high hydrocarbon fuel, such as diesel, and a trailing segment 109B (i.e., the segment where the fuel exits the reformer) contains more nickel than the leading segment for reforming low hydrocarbon fuel, such as natural gas or methane. The trailing segment is connected to a reformed fuel outlet conduit 153. The leading segment 109A contains a lower amount and/or concentration of nickel than the trailing segment 109B. The reformer 109 may comprise a housing and one or more catalyst coated inserts to form the above described low and high nickel segments. The actual nickel amount and/or concentration in each segment can be optimized based on the actual fuel that will be used, the system geometry, temperature and other variables. The reaction kinetics of higher hydrocarbons reforming to methane is faster than the reaction kinetics of methane reforming to produce syngas. Furthermore, the hybrid reformer can also be used together with internal reforming type fuel cells, to allow more methane slippage either by reducing the number of inserts or reducing the coated area of nickel catalyst. While a sharp, single step interface is shown in FIG. 1 between segments 109A and 109B, the nickel amount or concentration may be graded such that it increases monotonically or in plural steps from the inlet into segment 109A to the outlet in segment 109B. Thus, a sharp, single step interface between the segments is not required. Therefore, in one configuration, the reformer contains a graded composition increasing monotonically or in steps from segment 109A to segment 109B, with less nickel at the leading edge of segment 109A and more nickel at the trailing edge of segment 109B. The rhodium stabilizing catalyst amount or concentration may be substantially constant throughout the reformer, such that the leading and trailing segments contain substantially equal amounts of rhodium. In another configuration, the reformer contains a constant nickel amount or concentration throughout its length, such that the leading and trailing segments contain substantially equal amounts of nickel. However, in this configuration, the reformer contains more rhodium in segment 109A than in segment 109B. The rhodium amount or concentration may decrease from segment 109A to segment 109B in a stepwise fashion (single step or multiple steps) or it may be monotonically graded, such that segment 109A contains a higher amount or concentration of rhodium than segment 109B. In another configuration, the content of both nickel and rhodium varies between segment 109A and segment 109B. The nickel content increases in one or more steps or monotonically from segment 109A to segment 109B while the rhodium content decreases in one or more steps or monotonically from segment 109A to segment 109B. Thus, the leading segment 109A of the reformer contains a higher amount or concentration of the rhodium catalyst than the trailing segment 109B, and the leading segment 109A of the reformer contains a lower amount or concentration of the nickel catalyst than the trailing segment 109B. For higher hydrocarbon fuels, such as JP5 or diesel, a reformer containing a combination of graded nickel and rhodium increasing in the opposite directions along the reaction path may be used.

A method of operating the reformer 109 includes providing the high hydrocarbon fuel into the reformer, such that the fuel passes through the leading segment 109A before the trailing segment 109B. The fuel is reformed in the reformer into a reformate. The method further includes providing the reformate of the high hydrocarbon fuel into a fuel cell stack. The method further includes providing a low hydrocarbon fuel into the reformer, such that the fuel passes through the leading segment before the trailing segment. The fuel is reformed in the reformer into a reformate. The method also includes providing the reformate of the low hydrocarbon fuel into the fuel cell stack. Of course the order of providing the high and low hydrocarbon fuel into the reformer may be reversed and it is expected that the fuels may be switched several times during the operation and/or lifetime of the reformer.

Thus, the reformer 109 may be connected to both high and low hydrocarbon fuel sources. The high hydrocarbon fuel source may comprise a diesel or jet fuel tank. The low hydrocarbon fuel source may comprise a natural gas line or a fuel storage tank, such as a natural gas, methane, ethanol, etc. storage tank. A valve or other switching mechanism in the fuel inlet conduit 127 switches the type of fuel being provided to the reformer 109. The valve may be controlled by a computer or control system or manually by an operator.

The hybrid reformer allows the fuel cell system to operate on different fuels, such as higher and lower hydrocarbon fuels and provides fuel flexibility including all liquid and gaseous fuels. There is no need for having two sets of reformers depending on the application. This reduces the reformer and system cost. The reformer can also be used with internal reforming type fuel cells, such as internal reforming solid oxide fuel cells.

Figure 2:
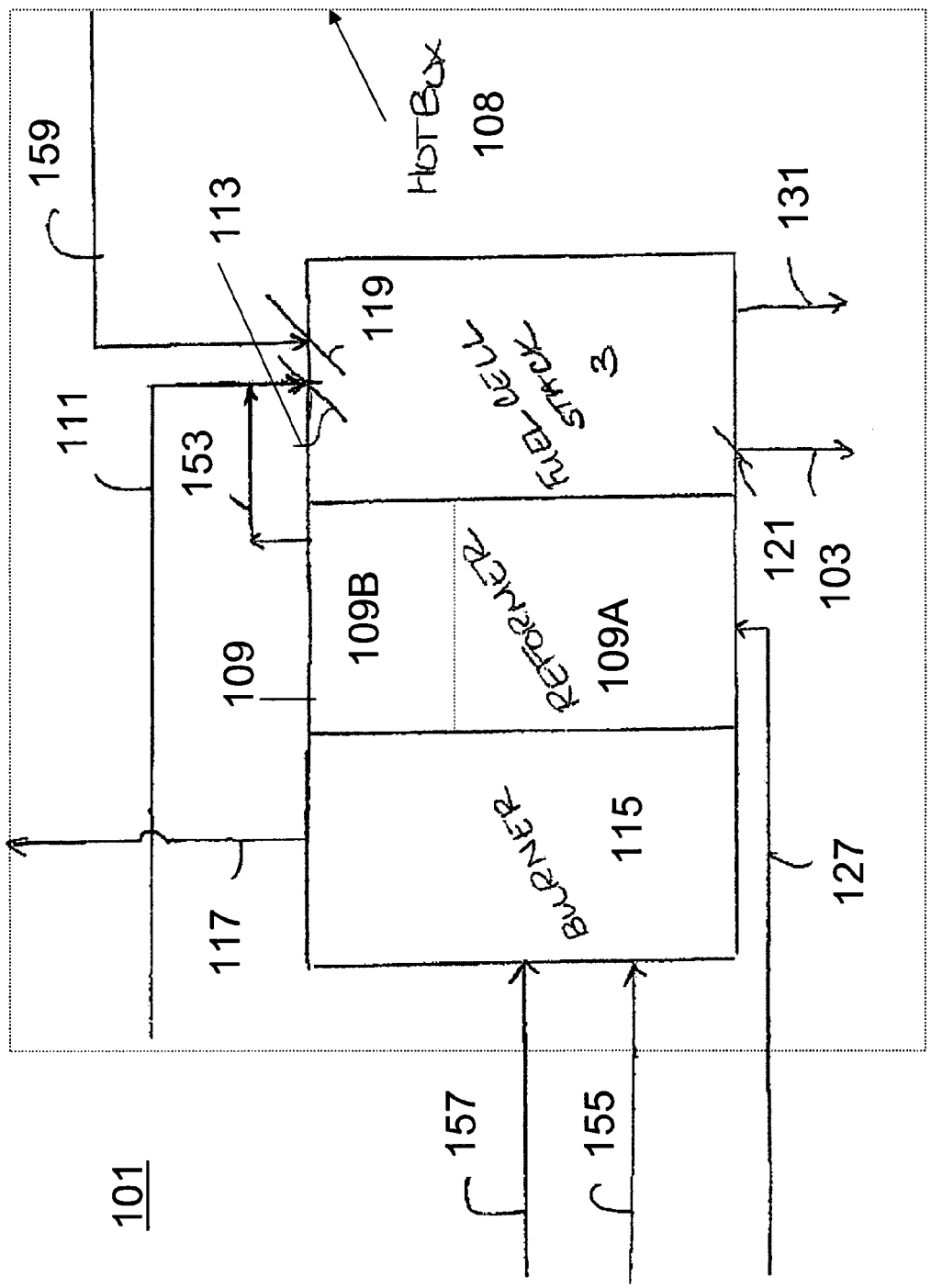

FIG. 2 illustrates details of a portion of the fuel cell system 101 which is located in the hot box 108. The hot box 108 may contain plural fuel cell stacks 3, such as solid oxide fuel cell stacks and other balance of plant components, such as heat exchangers, as described in U.S. application Ser. No. 11/002,681, filed Dec. 3, 2004, incorporated herein by reference in its entirety. Each fuel cell stack contains a plurality of high temperature fuel cells, such as solid oxide fuel cells. Each fuel cell contains an electrolyte, an anode electrode on one side of the electrolyte in an anode chamber, a cathode electrode on the other side of the electrolyte in a cathode chamber, as well as other components, such as interconnects which function as gas separator plates and electrical contacts, fuel cell housing and insulation. In an SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The fuel cells of the stack 3 may be internal reformation type fuel cells. Fuel cells of this type contain a fuel reformation catalyst in the anode electrode and/or in the anode chamber to allow the hydrocarbon fuel, such as an oxygenated hydrocarbon fuel, to be reformed internally on or adjacent to the fuel cell anode electrodes.

Alternatively, the fuel cells may be external reformation type fuel cells. Fuel cells of this type require that the reformer 109 be an external reformer either because these fuel cells lack the fuel reformation catalyst in the anode electrode and/or in the anode chamber, or because the internal reformation catalyst may not be able to reform a desired amount of hydrocarbon fuel. Thus, the fuel reformation may be external or partially internal and partially external (i.e., reformation in the reformer and in the fuel cells).

The 109 reformer is preferably located separately from but thermally integrated with the high temperature fuel cell stack 3 to support the endothermic reaction in the reformer 9 and to cool the stack 3. The system also preferably contains a burner or combustor 115. Thus, the system comprises a thermally integrated reformer 109, combustor 115 and stack 3. The reformer 109 may be heated by the stack cathode exhaust, by radiative and/or convective heat from the stack and/or by the combustor heat during steady state operation.

The term "thermally integrated" in this context means that the heat from the reaction in the fuel cell stack 3 drives the net endothermic fuel reformation in the fuel reformer 109. As illustrated in FIG. 2, the fuel reformer 109 may be thermally integrated with the fuel cell stack 3 by placing the reformer 109 and stack 3 in the same hot box 108 and/or in thermal contact with each other, or by providing a thermal conduit or thermally conductive material which connects the stack 3 to the reformer 109.

The stack 3 generates enough heat to conduct the steam reformation reaction in the reformer during steady-state operation of the system 101. However, under some different operating conditions ranging from low to high stack efficiency and fuel utilization, the exothermic heat generated by the stack 3 and provided to the reformer may be greater than, the same as or less than the heat required to support the reforming reaction in the reformer. The heat generated and/or provided by the stack 3 may be less than required to support steam reformation in the reformer 109 due to low fuel utilization, high stack efficiency, heat loss and/or stack failure/turndown. In this case, supplemental heat is supplied to the reformer. The system 1 provides the supplemental heat to the reformer 109 to carry out the reformation reaction during steady state operation. The supplemental heat may be provided from the burner or combustor 115 which is thermally integrated with the reformer 109 and/or from a cathode (i.e., air) exhaust conduit which is thermally integrated with the reformer 109. While less preferred, the supplemental heat may also be provided from the anode (i.e., fuel) exhaust conduit which is thermally integrated with the reformer. The supplemental heat may be provided from both the combustor 109 which is operating during steady state operation of the reformer and/or during start-up and from the cathode (i.e., air) exhaust of the stack 3. For example, the combustor 115 may be in direct contact with the reformer, and the stack cathode exhaust conduit 103 is configured such that the cathode exhaust contacts the reformer 109 and/or wraps around the reformer 109 to facilitate additional heat transfer. This lowers the combustion heat requirement for the reformation reaction.

The reformer 109 may be sandwiched between the combustor 115 and one or more stacks 3 to assist heat transfer as described in more detail below. For example, the reformer 109 and combustor 115 may share at least one wall or be positioned sufficiently close to each other for radiative and/or convective heat transfer. The combustor 115 closes the heat balance and provides additional heat required by the reformer. When no heat is required by the reformer, the combustor unit acts as a heat exchanger. Thus, the same combustor (i.e., burner) 115 may be used in both start-up and steady-state operation of the system 101. When using combustion catalysts coated on the conduit walls, the fuel may be introduced at several places in the combustion zone to avoid auto ignition and local heating.

In operation, a purified hydrocarbon fuel and steam mixture is fed to the lower end of the reformer 109 through the fuel inlet conduit 127. If desired, the heavy hydrocarbon fuel, such as diesel fuel, fuel may first be passed through a fractionator to separate the light ends from the heavy ends, as described in U.S. provisional application No. 60/788,044 filed on Apr. 3, 2006, which is incorporated herein by reference in its entirety. The separated light ends are then provided to the reformer 109 through conduit 127. A fractionator is a device which separates the shorter hydrocarbon chain species of the high hydrocarbon (i.e., diesel or jet) fuel from the longer hydrocarbon chain species. These are referred to as "light ends" (predominantly C1 to C8 hydrocarbons) and "heavy ends". The light ends are sent to a reformer. The fractionator can be completely eliminated if the reformer can handle higher hydrocarbons and hydrogen from anode exhaust gas recycled prevents potential coking. The fuel may be provided into the fractionator from a storage vessel, such as a diesel or jet fuel tank. A non-limiting example of a fractionator is a fractionation column, such as a distillation column containing trays and/or packing materials, of the type used in distillation of crude oil. The separation of the light and heavy ends in the fractionation column occurs by distillation of different ends in different zones of the column, with light and heavy ends being removed from different zones of the column.

If desired, the hydrocarbon fuel may be provided directly into the stack via a by-pass conduit 111 which by-passes the reformer 109. The reformed product is provided from the reformer into the stack anode (fuel) inlet 113 through conduit 153. The spent fuel is exhausted from the stack through the anode exhaust conduit 131. Air and fuel enters into the burner 115 via conduits 155 and 157.

The air enters the stack from air inlet conduit 159 through the cathode (air) inlet 119 and exits through exhaust opening 121 into the cathode (i.e., air) exhaust conduit 103. The system 101 is preferably configured such that the cathode exhaust (i.e., hot air) exits on the same side of the system as the inlet of the reformer 109. For example, as shown in FIG. 2, since the mass flow of hot cathode exhaust is the maximum at the lower end of the device, it supplies the maximum heat where it is needed, at feed point of the reformer. In other words, the mass flow of the hot air exiting the stack is maximum adjacent to the lower portion of the reformer where the most heat is needed. However, the cathode exhaust and reformer inlet may be provided in other locations in the system 101, such as to a steam generator. If desired, the hot combustor 115 exhaust may be provided into the steam generator through conduit 117 to heat the water in the generator to generate steam. The combustor exhaust may be provided into the steam generator in addition to or instead of one or more exhaust streams from the fuel cell stack 3.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order o explain the principles of the invention and its practical application. It is intended that the scope of the invention be defined by the claims appended hereto, and their equivalents.

The invention claimed is:

1. A reformer for a fuel cell system, comprising a leading segment and a trailing segment, wherein:
   the leading segment comprises less reactive catalyst than the trailing segment;
   the reactive catalyst comprises nickel;
   a rhodium stabilizing catalyst is located in the reformer; and
   the leading segment of the reformer contains a substantially equal amount or concentration of the rhodium stabilizing catalyst compared to the trailing segment.

2. The reformer of claim 1, wherein the leading segment contains a lower amount of nickel than the trailing segment.

3. The reformer of claim 1, wherein the leading segment contains a lower nickel concentration than the trailing segment.

4. The reformer of claim 1, wherein nickel amount or concentration increases between the leading segment and the trailing segment in a single step or in a graded fashion.

5. A fuel cell system, comprising:
   the reformer of claim 1; and
   at least one fuel cell stack.

6. The system of claim 5, wherein:
   the at least one fuel cell stack comprises an internal or an external reformation type solid oxide fuel cells;
   the reformer comprises an external reformer; and
   the reformer is thermally integrated with the at least one fuel cell stack.

7. The system of claim 6, further comprising a burner which is thermally integrated with the reformer.

8. The system of claim 5, further comprising a high hydrocarbon fuel source and a low hydrocarbon fuel source which are fluidly connected to the leading segment of the reformer.

9. The system of claim 8, wherein the high hydrocarbon fuel source comprises a diesel or jet fuel source, and the low hydrocarbon fuel source comprises a natural gas, methane, propane, ethanol or methanol fuel source.

10. A method of reforming different fuels, comprising:
    providing a reformer comprising a leading segment and a trailing segment, wherein the leading segment comprises less reactive catalyst than the trailing segment;
    providing a high hydrocarbon fuel into the reformer, such that the fuel passes through the leading segment before the trailing segment;
    providing a reformate of the high hydrocarbon fuel into a fuel cell stack;
    providing a low hydrocarbon fuel into the reformer, such that the fuel passes through the leading segment before the trailing segment; and
    providing a reformate of the low hydrocarbon fuel into a fuel cell stack.

11. The method of claim 10, wherein the reactive catalyst comprises nickel.

12. The method of claim 11, wherein the leading segment contains a lower amount of nickel than the trailing segment.

13. The method of claim 11, wherein the leading segment contains a lower nickel concentration than the trailing segment.

14. The method of claim 10, wherein:
    the reformer comprises an external reformer;
    the fuel cell stack comprises an internal or an external reformation type solid oxide fuel cells; and
    the reformer is thermally integrated with the fuel cell stack.

15. The method of claim 11, wherein:
    nickel amount or concentration increases between the leading segment and the trailing segment in a single step or in a graded fashion;
    a rhodium stabilizing catalyst is located in the reformer; and
    the leading segment of the reformer contains a substantially equal or higher amount or concentration of the rhodium stabilizing catalyst compared to the trailing segment.

16. A fuel cell system, comprising:
    at least one fuel cell stack;
    a reformer comprising a leading segment and a trailing segment, wherein the leading segment comprises less reactive catalyst than the trailing segment; and
    a high hydrocarbon fuel source and a low hydrocarbon fuel source which are fluidly connected to the leading segment of the reformer.

17. The system of claim 16, wherein the reactive catalyst comprises nickel.

18. The system of claim 17, wherein the leading segment contains a lower amount of nickel than the trailing segment.

19. The system of claim 17, wherein the leading segment contains a lower nickel concentration than the trailing segment.

20. The system of claim 17, wherein nickel amount or concentration increases between the leading segment and the trailing segment in a single step or in a graded fashion.

21. The system of claim 17, wherein:
a rhodium stabilizing catalyst is located in the reformer; and
the leading segment of the reformer contains a substantially equal amount or concentration of the rhodium stabilizing catalyst compared to the trailing segment.

22. The system of claim 17, wherein:
a rhodium stabilizing catalyst is located in the reformer; and
the leading segment of the reformer comprises more of the rhodium stabilizing catalyst than the trailing segment.

23. The system of claim 16, wherein:
the at least one fuel cell stack comprises an internal or an external reformation type solid oxide fuel cells;
the reformer comprises an external reformer; and
the reformer is thermally integrated with the at least one fuel cell stack.

24. The system of claim 23, further comprising a burner which is thermally integrated with the reformer.

25. The system of claim 16, wherein the high hydrocarbon fuel source comprises a diesel or jet fuel source, and the low hydrocarbon fuel source comprises a natural gas, methane, propane, ethanol or methanol fuel source.

* * * * *